No. 898,284.  
PATENTED SEPT. 8, 1908.  
J. STUBER.  
CULINARY VESSEL.  
APPLICATION FILED SEPT. 18, 1903.
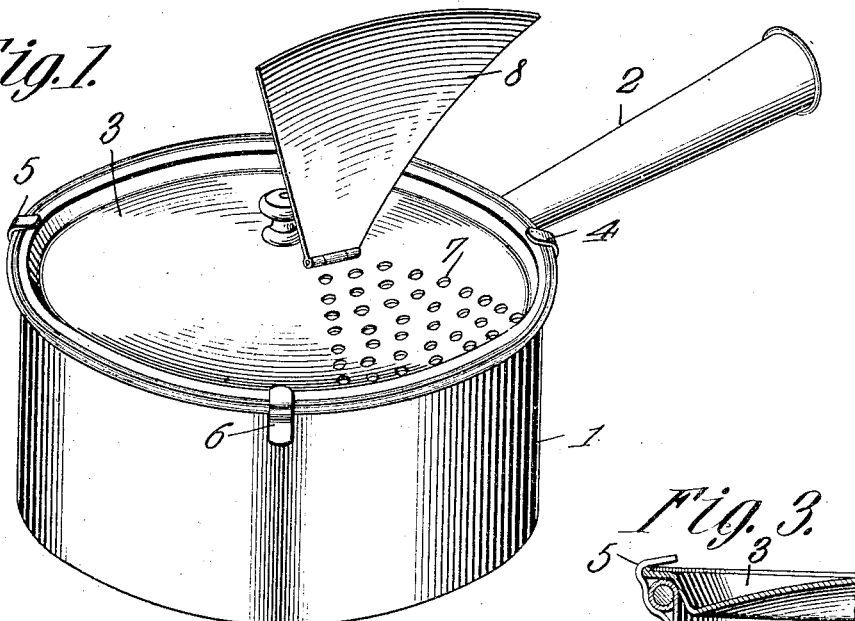
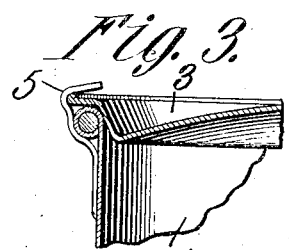
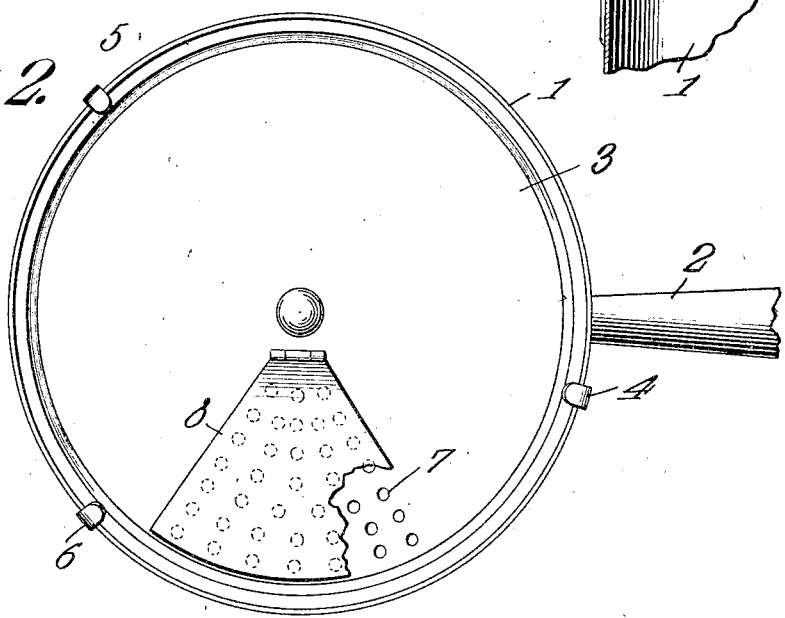
Witnesses:
Inventor  
Joseph Stuber  
By C. A. Snow & Co.  
Attorneys

UNITED STATES PATENT OFFICE.

JOSEPH STUBER, OF PEORIA, ILLINOIS, ASSIGNOR OF ONE-HALF TO HENRY G. KUCK, OF PEORIA, ILLINOIS.

CULINARY VESSEL.

No. 898,284.      Specification of Letters Patent.      Patented Sept. 8, 1908.

Application filed September 18, 1903. Serial No. 173,722.

*To all whom it may concern:*

Be it known that I, JOSEPH STUBER, citizen of the United States, residing at Peoria, in the county of Peoria and State of Illinois, have invented a new and useful Culinary Vessel, of which the following is a specification.

This invention relates generally to culinary utensils and particularly to that class provided with handles and employing detachable covers or lids.

The object of the present invention is so to improve the utensil as to adapt it in a novel and thoroughly effective manner to retain the cover in position when the utensil is tilted for the purpose of draining the contents thereof, and also to facilitate the positioning and removal of the cover relative to the utensil, and further to provide for the escape of steam while the cover is held in place upon the utensil.

With the above and other objects in view, as will appear as the nature of the invention is better understood, the same consists, generally stated, in a utensil embodying a vessel having a handle projecting from one side thereof, three spring clips secured to the vessel, one adjacent to the handle and the others at points equally spaced from a line drawn through the same, the upper ends of the clips being projected over the rim of the vessel, and a cover provided with drainage openings and designed to be held assembled with the utensil by the clips, the openings, when the lid is positioned, being disposed between the clip adjacent to the handle and the other contiguous clip thus to permit draining the contents of the utensil by tilting the same laterally.

The invention consists further in the various novel features of construction as will be hereinafter fully described.

In the accompanying drawings forming a part of this specification, and in which like characters of reference indicate corresponding parts:— Figure 1 is a view in perspective of a culinary utensil equipped with the improvements of the present invention. Fig. 2 is a top plan view of the utensil. Fig. 3 is a sectional detail view through a portion of the rim and the vessel, and showing the coöperation between the lid retaining clips and the lid.

Referring to the drawings, 1 designates a vessel of the sauce pan type, provided with the usual handle 2 and with the detachable cover 3.

Secured in any preferred manner to the rim portion of the vessel are three spring clips 4, 5 and 6, the first named clip being disposed adjacent to the handle, and the other two opposite the handle and at points equally spaced from a line drawn through the same. This arrangement will leave sufficient space between the clips 4 and 5 to permit the lateral insertion of the cover. As shown in Fig. 1, the clips project over the edge of the rim, and their under sides are inclined to the plane of the mouth of the vessel, providing thereby wedge-shaped crotches or seats to receive the periphery of the cover. By disposing the clips in the manner described, and by making them resilient, when the cover is placed in position, there will be sufficient pressure exerted upon it by the clips to insure its positive retention in place when the vessel is tilted laterally for the purpose of draining the contents thereof.

The cover is provided with any desired number of drainage openings 7, that are normally covered by a hinged lid or closure 8 and to facilitate draining the vessel, the cover will generally be so disposed as to bring the openings 7 between the lugs 4 and 6. The closure 8, while sealing the opening 7 will readily yield to steam pressure and thereby permit the escape of steam.

While the improvements herein defined are simple in construction, they will be found thoroughly efficient for the purposes described, and will result in the production of an efficient and highly convenient form of cooking vessel.

I claim:—

A culinary utensil embodying a vessel having a handle projecting from one side thereof, three spring clips secured to the vessel, one adjacent to the handle and the other two opposite the handle and at points equally spaced from a line drawn through the same, the upper ends of the clips being projected over the rim of the vessel, a cover arranged to be held assembled with the utensil by the clips and provided with drainage orifices, and a closure for normally sealing the orifices.

In testimony that I claim the foregoing as my own, I have hereto affixed my signature in the presence of two witnesses.

JOSEPH STUBER.

Witnesses:
CARLOTTA W. MERRIMAN,
CHRISTIAN FRABE.